(12) United States Patent
Shin et al.

(10) Patent No.: US 10,837,179 B2
(45) Date of Patent: Nov. 17, 2020

(54) FUNCTIONAL IMAGE TILE AND MANUFACTURING METHOD THEREFOR

(71) Applicant: INECO INC., Jeonju-si, Jeollabuk-do (KR)

(72) Inventors: Jae Moo Shin, Jeonju-si (KR); Jae Sung Shin, Jeonju-si (KR); Il Hwan Kim, Jeonju-si (KR)

(73) Assignee: INECO INC., Jeonju-si (KR)

( * ) Notice: Subject to any disclaimer, the term of this patent is extended or adjusted under 35 U.S.C. 154(b) by 0 days.

(21) Appl. No.: 16/071,812

(22) PCT Filed: Jan. 25, 2017

(86) PCT No.: PCT/KR2017/000889
§ 371 (c)(1),
(2) Date: Jul. 20, 2018

(87) PCT Pub. No.: WO2017/131438
PCT Pub. Date: Aug. 3, 2017

(65) Prior Publication Data
US 2019/0024383 A1    Jan. 24, 2019

(30) Foreign Application Priority Data
Jan. 25, 2016    (KR) .................. 10-2016-0008581

(51) Int. Cl.
*E04F 13/08* (2006.01)
*C04B 33/04* (2006.01)
*E04F 15/08* (2006.01)
*C04B 28/14* (2006.01)
(Continued)

(52) U.S. Cl.
CPC .......... *E04F 13/0871* (2013.01); *C04B 28/14* (2013.01); *C04B 33/04* (2013.01);
(Continued)

(58) Field of Classification Search
CPC ........ A01N 65/00; A01N 65/22; C04B 28/14; C04B 14/38; C04B 14/10
(Continued)

(56) References Cited

U.S. PATENT DOCUMENTS

2002/0193234 A1* 12/2002 Oda ....................... C04B 28/26
                                                                    501/80
2005/0218546 A1* 10/2005 Echeverria .............. C01F 11/18
                                                                    264/44
(Continued)

FOREIGN PATENT DOCUMENTS

KR    10-2001-0019471 A    3/2001
KR        20-0402140 Y1    11/2005
(Continued)

*Primary Examiner* — Betelhem Shewareged
(74) *Attorney, Agent, or Firm* — Novick, Kim & Lee, PLLC; Jae Youn Kim

(57) ABSTRACT

Disclosed are a functional image tile and a manufacturing method therefor, the tile: being manufactured by printing a desired image on a surface of a tile manufactured through a mixture produced by mixing red clay, basalt fiber and mulberry fiber with a raw material formed by mixing plaster and water; being capable of smoothly absorbing ink during image printing since the red clay and the plaster having excellent absorbency are mixed; enabling the image printed on the surface thereof to be prevented from peeling off or spreading by moisture; and exhibiting excellent heat resistance, strength, and moisture-adjusting capability since the basalt fiber and the mulberry fiber are mixed together.

5 Claims, 3 Drawing Sheets

(51) Int. Cl.
  *E04F 13/14* (2006.01)
  *C04B 111/00* (2006.01)
  *B44C 5/04* (2006.01)
  *C04B 14/38* (2006.01)
  *C04B 14/46* (2006.01)
  *C04B 16/02* (2006.01)
  *C04B 33/36* (2006.01)
  *C04B 103/54* (2006.01)

(52) U.S. Cl.
  CPC ............ *E04F 13/142* (2013.01); *E04F 15/08* (2013.01); *B44C 5/0453* (2013.01); *C04B 14/386* (2013.01); *C04B 14/4668* (2013.01); *C04B 16/02* (2013.01); *C04B 33/36* (2013.01); *C04B 2103/54* (2013.01); *C04B 2111/00482* (2013.01)

(58) Field of Classification Search
  USPC ...................................................... 428/195.1
  See application file for complete search history.

(56) References Cited

U.S. PATENT DOCUMENTS

| | | | |
|---|---|---|---|
| 2008/0194733 | A1* | 8/2008 | Green ................ C09D 11/322 523/160 |
| 2017/0183261 | A1* | 6/2017 | Shin ...................... A01N 65/00 |

FOREIGN PATENT DOCUMENTS

| | | |
|---|---|---|
| KR | 10-0677761 B1 | 2/2007 |
| KR | 10-2007-0077215 A | 7/2007 |
| KR | 10-0755242 B1 | 9/2007 |
| KR | 10-2010-0097273 A | 9/2010 |
| KR | 10-2011-0138844 A | 12/2011 |
| KR | 10-2013-0077851 A | 7/2013 |
| KR | 10-1361168 B1 | 2/2014 |
| KR | 10-1497027 B1 | 3/2015 |

* cited by examiner

FUNCTIONAL IMAGE TILE AND MANUFACTURING METHOD THEREFOR

TECHNICAL FIELD

The present invention relates to a functional image tile and a manufacturing method therefor, and more particularly, to a functional image tile and a manufacturing method therefor, wherein the tile is manufactured by printing desired images on the surface of a tile manufactured through a mixture produced by mixing red clay, basalt fiber and mulberry fiber with a raw material formed by mixing plaster and water, is capable of smoothly absorbing ink during image printing since the red clay and the plaster having excellent absorbency are mixed, enables the image printed on the surface thereof to be prevented from peeling off or spreading by moisture, and exhibits excellent heat resistance, strength, and moisture-adjusting capability since the basalt fiber and the mulberry fiber are mixed together.

BACKGROUND ART

Generally, concrete is a composite material produced by mixing sands, pebbles and water together with cement and is a construction material used the most in the earth, since the concrete has high resistance against water when compared to wood and steel and is liable to process into various shapes and dimensions.

Recently, as the perceptions of environmental surroundings are raised according to the national income increment, there are significant investments for improving city appearance by imparting various colors and designs departing from existing standardized and unified framework with thoroughly gray structures for various civil engineering and construction.

Recently, "sick house syndrome" due to formaldehyde which is generated from cement and wallpapers and flooring materials using various adhesives is issued, and interest in construction materials using natural components is rising and in addition, the interior is decorated by attaching and installing wallpapers or tiles with patterns to improve aesthetic impression.

These days, image tiles achieving desired images on tiles come into wide use for decorating walls or floors to improve ornament effect. The conventional image tile accomplishes images on a tile by using a silk screen printing method. In such screen method, the colors of an original drawing of an image are decomposed by a primary color decomposition method, films are formed for each decomposed primary color, and screen printing plates are manufactured for each primary color. However, such screen printing method requires a plurality of processes for the decomposition of colors and has limitations of deteriorating the production efficiency of image tiles. In addition, common tiles are manufactured by baking a clay-based material, and they are fragile during transporting or installation and are heavy and inconvenient for transportation/storage.

Next, Korean Registration Utility Model Publication No. 20-0402140 discloses "Ceramic image tile for wall painting".

The image tile is composed of a tile layer, an epoxy resin coated layer formed by applying an epoxy resin formed by diluting main agent:curing agent:diluents in a ratio of 2:1:1 on the tile layer, an image layer formed by directly printing images on the tile by using a printer of UV curing manner on the coated layer, and a urethane resin coated layer formed of main agent:diluents in a ratio of 2:1 on the image layer.

The conventional image tile including the aforementioned image tile is required to be accompanied with a forming work of a coated layer on the surface thereof to protect printed images on the surface of the image tile.

DISCLOSURE OF THE INVENTION

Technical Problem

The present invention is invented to solve the above-described limitations and has an object of providing an image tile enabling the image printed on the surface thereof to be prevented from peeling off or spreading by moisture and exhibiting excellent heat resistance, strength, and moisture-adjusting capability, and a manufacturing method therefor.

Technical Solution

In order to accomplish the object, there is provided in the present invention, a functional image tile manufactured by printing desired images on the surface of a tile manufactured through a mixture produced by mixing red clay, basalt fiber and mulberry fiber with a raw material formed by mixing plaster and water, wherein the functional tile is capable of smoothly absorbing ink during image printing since the red clay and the plaster having excellent absorbency are mixed; enables the image printed on the surface thereof to be prevented from peeling off or spreading by moisture; and exhibits excellent heat resistance, strength, and moisture-adjusting capability since the basalt fiber and the mulberry fiber are mixed together.

In addition, the functional image tile is produced by mixing 1-30 parts by weight of the red clay, 2-10 parts by weight of the basalt fiber, and 2-10 parts by weight of the mulberry fiber with respect to 100 parts by weight of the raw material formed by mixing 55-61 wt % of the plaster and 39-45 wt % of the water in the present invention.

In addition, the functional image tile is produced by further mixing 1-30 parts by weight of a *Pelargonium graveolens* extract, 1-30 parts by weight of phytoncide, and 1-30 parts by weight of charcoal with respect to 100 parts by weight of the raw material in the present invention.

In addition, there is provided in the present invention, a manufacturing method of a functional image tile, including a step of forming a raw material by mixing 55-61 wt % of plaster and 39-45 wt % of water; a step of forming a mixture by mixing 1-30 parts by weight of red clay, 2-10 parts by weight of basalt fiber, and 2-10 parts by weight of mulberry fiber with 100 parts by weight of the raw material; a step of manufacturing a tile by injecting the mixture in a mold cast or a die and then, de-molding; and a step of printing a desired image on the surface of the tile.

Advantageous Effects

The functional image tile manufactured as described above according to the present invention enables the image printed on the surface thereof to be prevented from peeling off or spreading by moisture; and exhibits excellent heat resistance, strength, and moisture-adjusting capability since the basalt fiber and the mulberry fiber are mixed together.

Particularly, in the present invention, the peeling off or spread by moisture of the image printed may be prevented by easily absorbing ink sprayed on the surface during image printing, since the plaster and the red clay having excellent absorbency are mixed, and a coating work for protecting the image may be omitted to simplify a working process, thereby achieving remarkable advantage of saving costs.

In addition, in the present invention, a *Pelargonium graveolens* extract is further mixed with the raw material, and effects of blocking and eradicating of the approach of various injurious insects including mosquito may be achieved. In addition, since phytoncide is further mixed with the raw material, antibacterial function, stress relief and improving effect of immune function may be anticipated.

MODE FOR CARRYING OUT THE INVENTION

Figure 1:
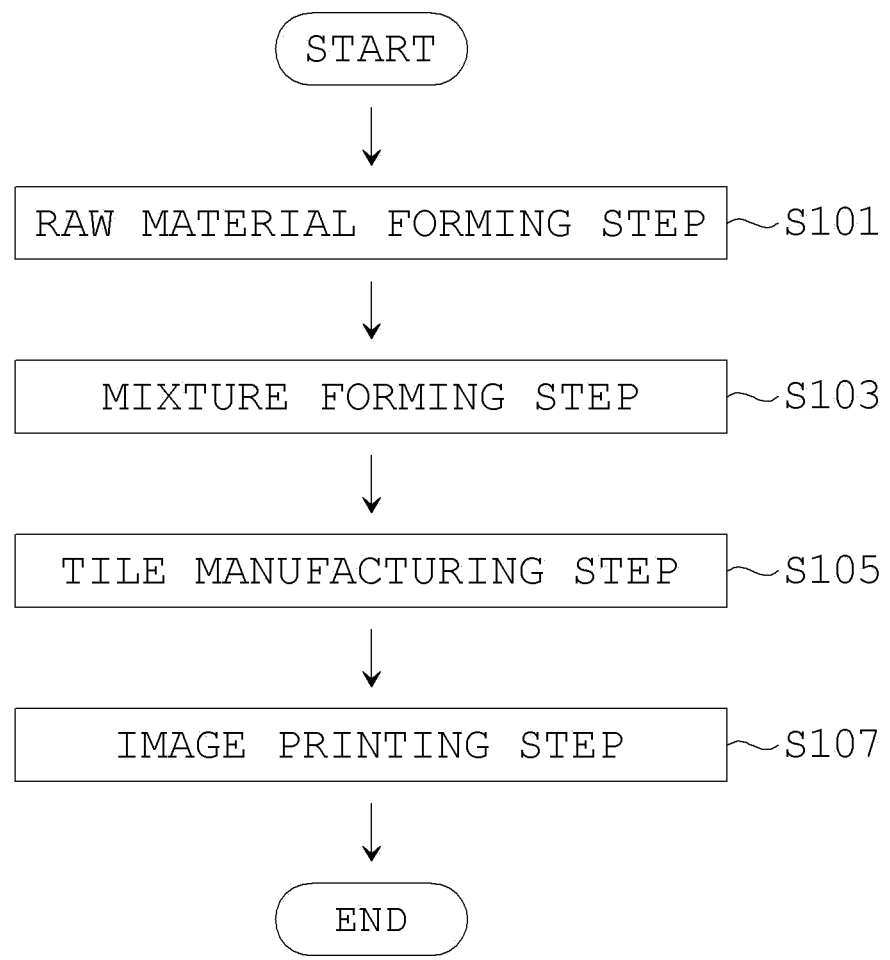
FIG. 1 is a manufacturing process diagram of a functional image tile according to the present invention.

Hereinafter, the functional image tile and the manufacturing method therefor according to the present invention will be described in more detail with reference to attached drawings.

The functional image tile according to the present invention is manufactured by printing desired images on the surface of a tile which is manufactured through a mixture formed by mixing red clay, basalt fiber and mulberry fiber with a raw material produced by mixing plaster and water. In the present invention, the method for printing images on the surface of the tile is not limited by the scope of the present invention, for example, the images may be printed by a direct printing method. Of course, a method of printing by forming an image layer on a transfer paper and attaching the transfer paper on a tile, may be used, but in the manufacture of the tile according to the present invention, ink is easily absorbed during image printing, since plaster and red clay having excellent absorbency are mixed, and thus, image printing may be easily performed.

The raw material according to the present invention is formed by mixing 55-61 wt % of plaster and 39-45 wt % of water. The water is mixed in an amount of 39-45 wt %, because the curing rate is dependent on the mixing amount of water. The reason why the curing rate is required to be controlled is as follows. After pouring the mixture formed from the raw material into a plurality of mold casts in order, working for removing bubbles remaining in the mold cast is necessary. If the curing rate is too fast, the bubbles may not be removed, and quality may be degraded or defects may be generated during manufacturing the tile.

If the amount of the plaster is less than 55 wt %, curing may be late and the amount of water is large, and thus, finishing efficiency of backside during molding is degraded and adverse effect of decreasing strength after finishing a product may arise. In addition, the formation of pores for retaining the functionality of a porous material may become difficult.

Meanwhile, if the amount of the plaster is more than 61 wt %, the curing rate is too fast, molding working is difficult, and the removal of surface bubbles is difficult, thereby easily generating defects after finishing. In addition, the size of the pores for retaining the functionality of a porous material decreases to deteriorate functionality.

If the amount of the water is less than 39 wt %, the same phenomena shown when the amount of the plaster is more than 61% are shown, and if the amount of the water is more than 45 wt %, the same phenomena shown when the amount of the plaster is less than 44% are shown.

Next, in the present invention, a mixture is formed by mixing red clay, basalt fiber and mulberry fiber with the raw material.

The red clay blocks various harmful substances generated in residence space and has deodorization and purifying effects such as poison removing power, disintegration power, dehumidifying ability, and moisturizing power, and the properties of far-infrared radiation and as an incombustible material due to its own function, and further has the function of total four kinds of enzyme components of katalase, diphenol oxydase, saccharase and protease. The katalase plays the role of removing hydrogen peroxide which is a toxic agent. In the human body, toxic agents generated during metabolism induce aging phenomenon, the strong absorbency of the clay prevents the aging phenomenon, by which toxic lipid peroxides in the body is neutralized or diluted. The diphenol oxydase acts as a catalyst of an oxidation reaction which is carried out using molecular oxygen. The diphenol oxydase is essential for obtaining necessary energy for living and the synthesis of biological ingredients, and enables the oxidation and reduction of various organic/inorganic compounds in vivo. The saccharase is an enzyme which hydrolyze sucrose into glucose (grape sugar) and fructose, and the protease plays the role of hydrolyzing protein into amino acids during the mineralization of nitrogen in protein and instantly decomposes and breaks other rotten cells such as unnecessary cancer beyond immunity. The red clay including such enzymes produces far-infrared to promote the blood flow, promotes sweating function, excretes waste accumulated in the body, and discharges heavy metals, and has excellent advantages of antibacterial and mothproofing effects, preventing the propagation of molds and dehumidifying ability. In addition, the red clay has the purifying function of contaminated air which is caused by chemical electrical radiating materials, purifies harmful materials such as formalin, removes cigarette smoke and bad smell, blocks harmful electromagnetic waves, and has filtering function and moisture-adjusting function.

By mixing the red clay having the aforementioned various effects with the raw material in the present invention, the own advantages of the red clay may be strengthened and its functionality may be maximized. To achieve the effects, the red clay is mixed in an amount of 1-30 parts by weight with respect to 100 parts by weight of the raw material. If the red clay is mixed in an amount less than 1 part by weight, the component amount is shortfall and various effects of the red clay may not be achieved.

If the red clay is mixed in an amount more than 30 parts by weight, surface porosity is decreased and functionality may be deteriorated.

The basalt fiber is obtained via the fibrosis of natural basalt, has excellent tensile strength, low density, low thermal expansion property, heat resistance, chemical stability, self lubricative, elasticity and sound absorption, is strong against fire, and has increased tensile strength so as to compensate fragile disadvantage. The basalt fiber has better properties than common glass fiber, is eco-friendly and has advantages of being suitable for finishing materials of interior.

The basalt fiber is mixed in an amount of 2-10 parts by weight with respect to 100 parts by weight of the raw material. If the basalt fiber is mixed in an amount less than 2 parts by weight, defects of deteriorating heat resistance and strength may arise, and if the amount is more than 10 parts by weight, uniform molding is not achieved due to excessive agglomeration phenomenon and the production of articles is difficult.

The mulberry fiber is the raw material of Korean paper (Hanji) and has excellent moldability and eco-friendly property, and thus, may improve interior function that vivify the feeling of the Korean paper, moisture-adjusting capability, and resistance to environmental skin disease such as atopy.

The mulberry fiber is mixed in an amount of 2-10 parts by weight with respect to 100 parts by weight of the raw material. If the mulberry fiber is mixed in an amount less than 2 parts by weight, defect of degrading moisture-adjusting capability arises, and if the amount is more than 10 parts by weight, uniform molding may not be achieved due to excessive agglomeration phenomenon in common with the basalt fiber.

In addition, the present invention forms a mixture by further mixing a *Pelargonium graveolens* extract, phytoncide and charcoal with the raw material and may produce a tile having more diverse functions (advantages).

*Pelargonium graveolens* is included in *Pelargonium* species, releases pennyroyal mint flavor and citronella flavor, and has effects of blocking and eradicating various harmful insects such as mosquito so as to prevent their approach via the own insect repellent perfume retained in the flavors. The *Pelargonium graveolens* extract may be extracted via diverse methods, for example, by separating leaves from the *Pelargonium graveolens*, compressing thereof, and separating and removing solid contents.

The *Pelargonium graveolens* extract is mixed in an amount of 1-30 parts by weight with respect to 100 parts by weight of the raw material. If the *Pelargonium graveolens* extract is mixed in an amount less than 1 part by weight, the component amount is shortfall, and the blocking and eradicating effects of mosquito and harmful insects may be degraded. In addition, since the *Pelargonium graveolens* extract releases flavor of roses, if a large amount of the *Pelargonium graveolens* extract within the standard range is mixed, effects as an air freshener may be obtained.

Meanwhile, if the *Pelargonium graveolens* is mixed in an amount more than 30 parts by weight, functionality is not increased but the curing of the original raw material is rather inhibited to generate strength degradation.

The phytoncide is a natural antibacterial substance released to withstand to microorganisms or pathogenic bacterium around plants, and has effects of stress relief, immune function improvement, central nerves stabilization, and deodorization as well as antibacterial property. Thus, the phytoncide is used as an air freshener, a treating agent of atopy, a remover of harmful gas due to sick house syndrome.

The phytoncide is mixed in an amount of 1-30 parts by weight with respect to 100 parts by weight of the raw material. If the phytoncide is mixed in an amount less than 1 part by weight, defects of degrading antibacterial property, stress relieving function, immune function, deodorization function may be shown.

If the phytoncide is mixed in an amount more than 30 parts by weight, functionality is not increased but the curing of the original raw material is rather inhibited to generate strength degradation.

The charcoal purifies the air and emits a large amount of anions to influence parasympathetic nerves, stabilize feeling and relax body tension, and emits far-infrared to stimulate blood circulation. In addition, charcoal has excellent adsorptive power, conductivity and power accumulation property, blocks electromagnetic waves, has odor adsorption effect, purifies the air, adjusts humidity, has antibacterial and detoxification function, prevents infect invasion, and helps sound sleep and fatigue recovery to restore energy.

The charcoal is mixed in an amount of 1-30 parts by weight with respect to 100 parts by weight of the raw material, and may further maximize the functions such as air purification, air purification and deodorization effects, pest control, electromagnetic wave absorption, antibacterial effect, sound sleep and fatigue recovery functions, energy restoration, anion radiation and humidity control. If the charcoal is mixed in an amount less than 1 part by weight, the component amount is shortfall and various effects served by charcoal may not be achieved.

Meanwhile, if the charcoal is mixed in an amount more than 30 parts by weight, the porosity of the surface may be degraded and the charcoal may be smeared from the product surface.

In regard each fiber (basalt fiber, mulberry fiber) used in the present invention, if the amount is less than 2 parts by weight, the function as the fiber may not be exhibited, and if the amount is more than 10 parts by weight, the functionality may not be improved and fiber agglomeration phenomenon may be generated.

To the functional image tile, 1-30 parts by weight of each of at least one among citronella essence and rosemary essence may be further mixed with respect to 100 parts by weight of the raw material. The essences relate to the improvement of mothproofing function.

The additionally used carbon fiber also generates the aforementioned defects if the amount mixed thereof deviates from the amount range by parts by weight like other fibers.

To the functional image tile including the carbon fiber, 1-30 parts by weight of each of at least one among citronella essence and rosemary essence may be further mixed with respect to 100 parts by weight of the raw material.

If the amount of the essence is less than 1 part by weight, mothproofing function may be insignificant, and if the amount is more than 30 parts by weight, excessive effects may be obtained and costs may increase.

In the present invention, the mixture thus formed is injected into a mold case or a die, molded and de-molded to manufacture a tile, and desired images (for example, photographs, characters or landscapes) are printed on the surface of the tile.

FIG. 1 is a manufacturing process diagram of the functional image tile according to the present invention (S 101-S 107).

The process includes a step of forming a raw material by mixing 55-61 wt % of plaster and 39-45 wt % of water; a step of forming a mixture by mixing 1-30 parts by weight of red clay, 2-10 parts by weight of basalt fiber, and 2-10 parts by weight of mulberry fiber with 100 parts by weight of the raw material; a step of manufacturing a tile by injecting the mixture in a mold cast or a die and then, de-molding; and a step of printing a desired image on the surface of the tile.

Figure 2:
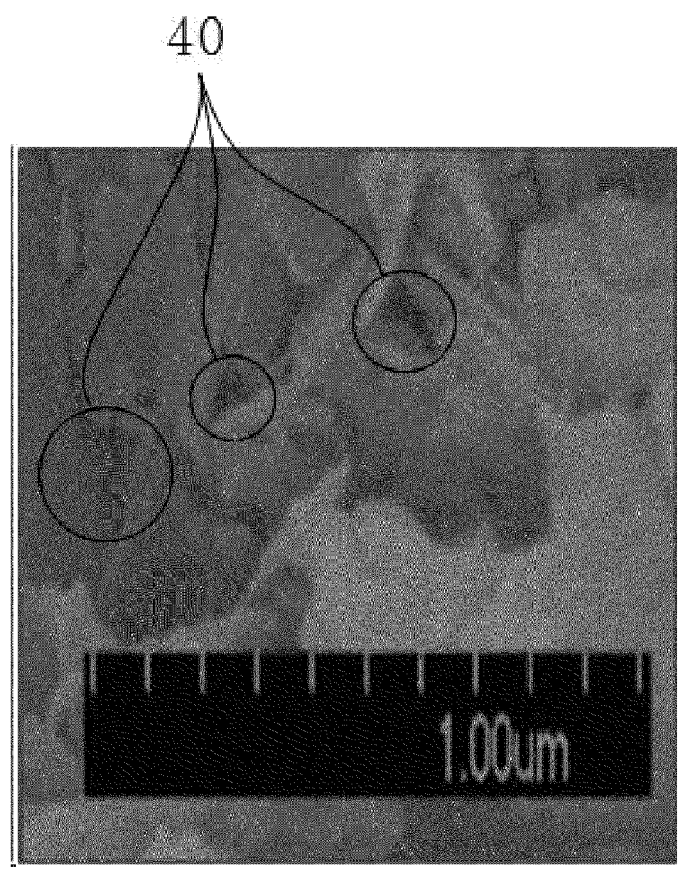
FIG. 2 is an electron microscope photographic image of a functional image tile according to the present invention.

FIG. 2 is an electron microscope photographic diagram of the tile according to the present invention. As shown in FIG. 2, a lot of pores (40) are formed in the tile according to the present invention. The pores formed at the surface of the tile improve the ventilation of the air and the effect of moisture absorption and greatly influence the control of indoor temperature and humidity.

The conventional tile has small surface pores and is unable to absorb indoor humidity, and thus, the surface of the tile becomes covered with dew in a humid space. Then, molds are generated on wall surfaces and a resident may have a respiratory disease or express displeasure due to life in unclean environment. In addition, since the air does not flow through the conventional tile, the air ventilation is bad, the humidity in a living space increases, thereby generating the propagation of virus or molds. In addition, far-infrared radiation, humidity control, deodorization and antibacterial effect may be hardly obtained. Accordingly, the conventional tile is used only for cleaning or decoration, and corresponds to a simple interior material for construction without health promoting function.

In addition, on the conventional image tile, images are printed on the surface of the conventional tile which has small surface pores, but a coating work (for example, work for coating a urethane resin) is required on the images to protect the printed images. Such a coating layer formed on the surface of the tile blocks all pores formed at the surface of the tile and completely blocks the air ventilation, thereby further degrading air permeability.

On the contrary, the tile according to the present invention includes lots of pores formed at the surface thereof, and has excellent air purification performance and smoothly controls indoor humidity. Thus, the propagation of bacteria and molds in a living space may be prevented.

In addition, since the image tile manufactured by printing images on the surface of the tile is manufactured by mixing plaster and red clay having excellent absorbency, ink may be easily absorbed during printing the images on the surface and the peeling off of the printed image or the spread phenomenon by moisture may be prevented. Therefore, a coating work for forming a coating layer for protecting images may be omitted, and the blocking of the pores formed at the surface by the coating layer may be prevented. Thus, the degradation of effects obtainable by mixing the red clay, the basalt fiber and the mulberry fiber may be prevented.

Meanwhile, image tiles are combined in order along the width and height of the surface of a wall for construction, and different images are printed on most surfaces. Here, the different images are separated images obtained by separating one single image. For example, in a single image including flowers and butterflies as in FIG. 3, a butterfly (30) is printed on a tile (20) positioned at lower left end among the plurality of tiles, and a petal (30') among the image of flowers is printed on a tile (20') positioned at upper center position. Each of the plurality of tiles may not display one complete image, but may be appropriately arranged to display one complete image as a whole.

Figure 3:
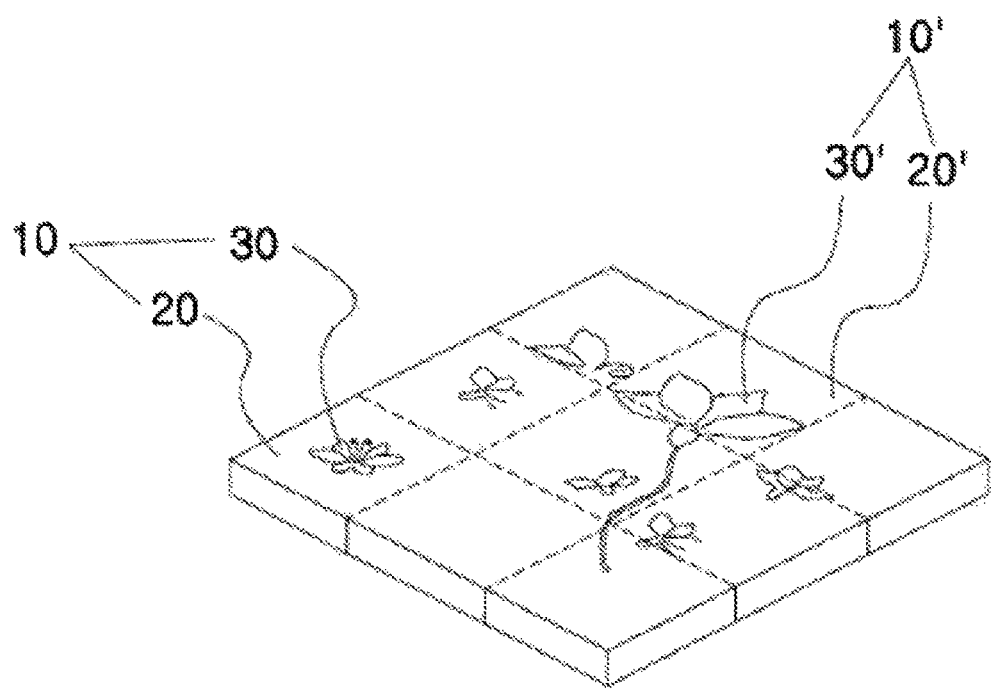
FIG. 3 is an example diagram showing a combined state of a plurality of functional image tiles according to an embodiment of the present invention.

Of course, the plurality of tiles may have the same image, but a displaying method of each separated image on each tile is used to express aesthetic impression or three-dimensional effect. That is, since the images are not printed on the entire surface of a single tile, all the plurality of pores formed on the surface thereof is not blocked, and no image may be printed at all like the tile constructed at the right of the tile (20) on which the butterfly (30) is printed as shown in FIG. 3. Thus, if a plurality of the functional image tile (10) according to the present invention are constructed in plural, various effects and efficacy obtainable from red clay, basalt fiber and mulberry fiber as well as from further included components as necessary such as a *Pelargonium graveolens* extract, phytoncide and charcoal, may be anticipated.

Example 1

60 wt % of plaster and 40 wt % of water were mixed to form a raw material, and 25 parts by weight of red clay, 9 parts by weight of basalt fiber, and 7 parts by weight of mulberry fiber with respect to 100 parts by weight of the raw material were mixed to form a mixture.

The mixture was injected into a mold cast, cured and de-molded from the mold cast to manufacture a tile. Then, images were printed on the surface of the tile to manufacture a functional image tile according to the present invention.

Example 2

60 wt % of plaster and 40 wt % of water were mixed to form a raw material, and 5 parts by weight of red clay, 5 parts by weight of basalt fiber, and 5 parts by weight of mulberry fiber with respect to 100 parts by weight of the raw material were mixed to form a mixture.

The mixture was injected into a mold cast, cured and de-molded from the mold cast to manufacture a tile. Then, images were printed on the surface of the tile to manufacture a functional image tile according to the present invention.

Example 3

60 wt % of plaster and 40 wt % of water were mixed to form a raw material, and 30 parts by weight of red clay, 10 parts by weight of basalt fiber, and 10 parts by weight of mulberry fiber with respect to 100 parts by weight of the raw material were mixed to form a mixture.

The mixture was injected into a mold cast, cured and de-molded from the mold cast to manufacture a tile. Then, images were printed on the surface of the tile to manufacture a functional image tile according to the present invention.

Example 4

60 wt % of plaster and 40 wt % of water were mixed to form a raw material, and 25 parts by weight of red clay, 9 parts by weight of basalt fiber, 7 parts by weight of mulberry fiber, 20 parts by weight of a *Pelargonium graveolens* extract, 20 parts by weight of phytoncide, and parts by weight of charcoal with respect to 100 parts by weight of the raw material were mixed to form a mixture.

The mixture was injected into a mold cast, cured and de-molded from the mold cast to manufacture a tile. Then, images were printed on the surface of the tile to manufacture a functional image tile according to the present invention.

Comparative Example 1

60 wt % of plaster and 40 wt % of water were mixed to form a raw material, and 40 parts by weight of red clay, 1 part by weight of basalt fiber, and 20 parts by weight of mulberry fiber with respect to 100 parts by weight of the raw material were mixed to form a mixture.

The mixture was injected into a mold cast, cured and de-molded from the mold cast to manufacture a tile. Then, images were printed on the surface of the tile to manufacture a functional image tile according to the present invention.

TABLE 1

| Division | Harmful substance adsorption/odor removal | Humidity control | Soundproof/ fire resistance | Immune function improvement | Mothproof function |
|---|---|---|---|---|---|
| Example 1 | 5 | 5 | 5 | 1 | 0 |
| Example 2 | 5 | 5 | 3 | 0 | 0 |
| Example 3 | 5 | 5 | 5 | 1 | 0 |

TABLE 1-continued

| Division | Harmful substance adsorption/odor removal | Humidity control | Soundproof/ fire resistance | Immune function improvement | Mothproof function |
|---|---|---|---|---|---|
| Example 4 | 5 | 5 | 5 | 5 | 5 |
| Comparative Example 1 | 3 | 3 | 3 | 1 | 0 |

* Experimental examples (the degree of effect is represented by 0-5 (the greater the number is, the better the effect is))

As shown in the above results, tiles manufactured using all components described in the present invention in appropriate amounts showed the most excellent effects.

INDUSTRIAL APPLICABILITY

The present invention may be used as exterior materials or interior materials, particularly, in a building, an office, etc.

The invention claimed is:

1. A functional image tile having an image on a surface thereof, the functional image tile comprising:
    a mixture formed of red clay, basalt fiber, mulberry fiber, and carbon fiber; and
    a raw material formed of plaster and water,
    wherein the functional image tile is capable of absorbing ink during printing of the image and enabling the image on the surface thereof to be prevented from peeling off or spreading by moisture,
    wherein the mixture includes 1-30 parts by weight of the red clay, 2-10 parts by weight of the basalt fiber, 2-10 parts by weight of the mulberry fiber, and 2-10 parts by weight of the carbon fiber with respect to 100 parts by weight of the raw material formed of 55-61 wt % of the plaster and 39-45 wt % of the water.

2. The functional image tile according to claim 1, wherein the functional image tile further comprises 1-30 parts by weight of a *Pelargonium graveolens* extract, 1-30 parts by weight of phytoncide, and 1-30 parts by weight of charcoal with respect to 100 parts by weight of the raw material.

3. The functional image tile according to claim 1, wherein the functional image tile further comprises 1-30 parts by weight of citronella essence or rosemary essence with respect to 100 parts by weight of the raw material.

4. A manufacturing method of a functional image tile, the method comprising:
    forming a raw material by mixing 55-61 wt % of plaster and 39-45 wt % of water;
    forming a mixture by mixing 1-30 parts by weight of red clay, 2-10 parts by weight of basalt fiber, 2-10 parts by weight of mulberry fiber, and 2-10 parts by weight of carbon fiber with respect to 100 parts by weight of the raw material;
    manufacturing a base tile by injecting the mixture in a mold cast or a die and then, de-molding; and
    printing a desired image on a surface of the base tile.

5. The functional image tile according to claim 1, wherein the functional image tile further comprises 1-30 parts by weight of citronella essence and 1-30 parts by weight of rosemary essence with respect to 100 parts by weight of the raw material.

* * * * *